United States Patent
Schafer et al.

(10) Patent No.: US 9,016,800 B2
(45) Date of Patent: Apr. 28, 2015

(54) AUXILIARY DRIVETRAIN FOR A COLD PLANER

(71) Applicant: Caterpillar Inc., Peoria, IL (US)

(72) Inventors: Benjamin Thomas Schafer, Elk River, MN (US); Kevin J. Rodel, Isanti, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 14/515,641

(22) Filed: Oct. 16, 2014

(65) Prior Publication Data

US 2015/0035341 A1 Feb. 5, 2015

Related U.S. Application Data

(63) Continuation of application No. 13/770,365, filed on Feb. 19, 2013, now Pat. No. 8,905,488.

(51) Int. Cl.
| | |
|---|---|
| *E01C 23/088* | (2006.01) |
| *E01C 23/12* | (2006.01) |
| *F16H 7/02* | (2006.01) |
| *E21C 31/02* | (2006.01) |

(52) U.S. Cl.
CPC ............... *E01C 23/088* (2013.01); *F16H 7/02* (2013.01); *E01C 23/127* (2013.01); *E21C 31/02* (2013.01)

(58) Field of Classification Search
CPC ............................... E01C 23/127; E21C 31/02

USPC ................................................ 299/39.1, 39.4
See application file for complete search history.

(56) References Cited

U.S. PATENT DOCUMENTS

| | | | |
|---|---|---|---|
| 4,171,147 A | 10/1979 | Swisher, Jr. et al. |
| 4,325,580 A | 4/1982 | Swisher, Jr. et al. |
| 4,929,121 A | 5/1990 | Lent et al. |
| 7,644,994 B2 | 1/2010 | Busley et al. |
| 7,901,010 B2 | 3/2011 | Busley et al. |
| 7,922,255 B2 | 4/2011 | Busley et al. |
| 7,976,106 B2 | 7/2011 | Berning et al. |
| 8,608,250 B2 | 12/2013 | O'Neill |
| 2004/0021364 A1 | 2/2004 | Busley et al. |
| 2005/0206216 A1 | 9/2005 | O'Neill |
| 2011/0215634 A1 | 9/2011 | Busley et al. |
| 2013/0143714 A1 | 6/2013 | Wachsmann et al. |

FOREIGN PATENT DOCUMENTS

EP 2322718 A2 5/2011

*Primary Examiner* — David Bagnell
*Assistant Examiner* — Michael Goodwin
(74) *Attorney, Agent, or Firm* — Finnegan, Henderson, Farabow, Garrett & Dunner, LLP

(57) ABSTRACT

A cold planer is disclosed. The cold planer may have a frame, a drum rotatably mounted to the frame, and a gear box connected to the drum. The cold planer may also have a drive pulley connected to the gear box, a primary motor, and a drive belt connecting the primary motor to the drive pulley. The cold planer may further have a service pulley connected to the gear box, a service motor, and a service belt that connects the service motor to the service pulley. The cold planer may additionally have the gear box being configured to transfer motion from the drive pulley and the service pulley to the drum.

20 Claims, 3 Drawing Sheets

AUXILIARY DRIVETRAIN FOR A COLD PLANER

This application is a continuation of U.S. application Ser. No. 13/770,365, filed Feb. 19, 2013.

TECHNICAL FIELD

The present disclosure is directed to a cold planer and, more particularly, to an auxiliary drivetrain for a cold planer.

BACKGROUND

Cold planers, sometimes also called road mills, scarifiers, or surface treatment machines, rotate a drum with cutting bits over a work surface. These machines are designed to prepare or treat a surface like a road, pavement, or soil. A motor connected to the drum by way of a drive train and gear box rotates the drum so that the cutting bits alter the work surface. The cutting bits contact the work surface and cause it to be broken into pieces and removed. The forces exerted by the cutting bits on the work surface can be significant, and as a result the cutting bits can wear.

Since the cutting bits are subject to wear, they need to be regularly inspected and replaced. In order for the drum to be inspected, it needs to be lifted off of the work surface and selectively rotated at a slow speed and for small angles of rotation. The motor described above is set up to drive the drum somewhat more continuously, forcefully, and quickly than is useful for drum inspection. A separate auxiliary drive system is needed to rotate the drum for inspection and servicing.

One attempt to address this issue is described in U.S. Pat. No. 7,644,994 filed by Busley et al., and issued on Jan. 12, 2010. The '994 patent describes a milling device having an auxiliary drive located inside of an associated drive belt. The auxiliary drive includes a friction roller that can engage the drive belt or a drive pulley connected to the milling drum. By using a friction roller, the '994 patent reduces the risk of turning the work drum too forcefully.

Although the '994 patent provides a way of rotating the work drum for inspection and service, the design may also have drawbacks. The auxiliary drive of the '994 patent being located inside the drive belt may present issues when attempting to retrofit older machines. On machines that were not originally designed with an auxiliary drive, the area inside of the drive belt may not be suitable for installing an auxiliary drive such as that of the '994 patent. Additionally, mounting the auxiliary drive motor inside the belt drive may expose the motor to high levels of vibration and dust, which can reduce the service life and reliability of the auxiliary drive.

The present disclosure is directed toward one or more of the problems set forth above.

SUMMARY

In one aspect, the present disclosure relates to a cold planer. The cold planer may include a frame, a drum rotatably mounted to the frame, and a gear box connected to the drum. The cold planer may also include a drive pulley connected to the gear box, a primary motor, and a drive belt connecting the primary motor to the drive pulley. The cold planer may further include a service pulley connected to the gear box, a service motor, and a service belt that connects the service motor to the service pulley. The cold planer may additionally include the gear box being configured to transfer motion from the drive pulley and the service pulley to the drum.

In another aspect, the present disclosure is directed to a method of operating a cold planer. The method may include pressurizing a fluid and directing pressurized fluid through a hydraulic motor to rotate a first belt. The method may also include transferring a first motion from the first belt to a gear box and transferring the first motion from the gear box to a drum to continuously rotate the drum during normal operation of the cold planer. The method may additionally include directing electricity through an electric motor to rotate a second drive belt. The method may further include transferring a second motion from the second drive belt to the gear box, and transferring the second motion from the gear box to rotate the drum during servicing of the cold planer.

DETAILED DESCRIPTION

Figure 1:
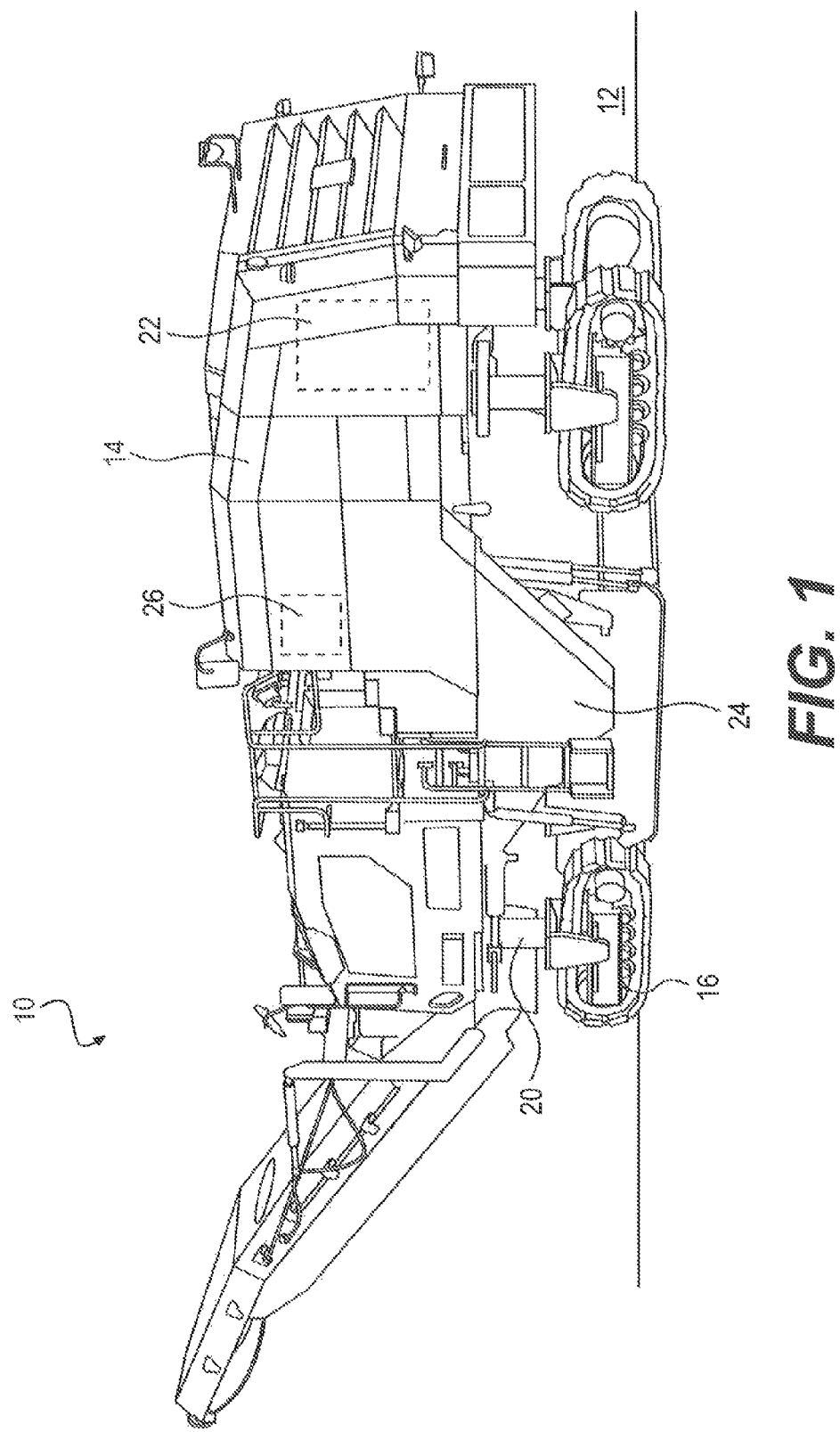
FIG. 1 is a pictorial illustration of an exemplary disclosed cold planer.

FIG. 1 illustrates an exemplary cold planer 10. Cold planer 10 may include a frame 14 connected to one or more traction units 16, and a milling drum 18 (shown only in FIGS. 2 and 3) supported from frame 14 at a general center of cold planer 10 between traction units 16. Traction units 16 may each include either a wheel or a track section that is pivotally connected to frame 14 by a lifting column 20. Lifting columns 20 may be adapted to controllably raise, lower, and/or tilt frame 14 relative to the associated traction units 16. A power source (e.g. an engine) 22 may be configured to electrically, mechanically, hydraulically, and/or pneumatically power traction units 16, milling drum 18, and lifting columns 20.

For the purpose of this disclosure, the term "asphalt" may be defined as a mixture of aggregate and asphalt cement. Asphalt cement may be a brownish-black solid or semi-solid mixture of bitumen obtained as a byproduct of petroleum distillation. The asphalt cement may be heated and mixed with the aggregate for use in paving roadway surfaces, where the mixture hardens upon cooling. A "cold planer" may be defined as a machine used to remove layers of hardened asphalt from an existing roadway surface 12. It is contemplated that the disclosed cold planer may also or alternatively be used to remove lime-based cement, concrete, and other roadway materials from surface 12, if desired.

Figure 2:
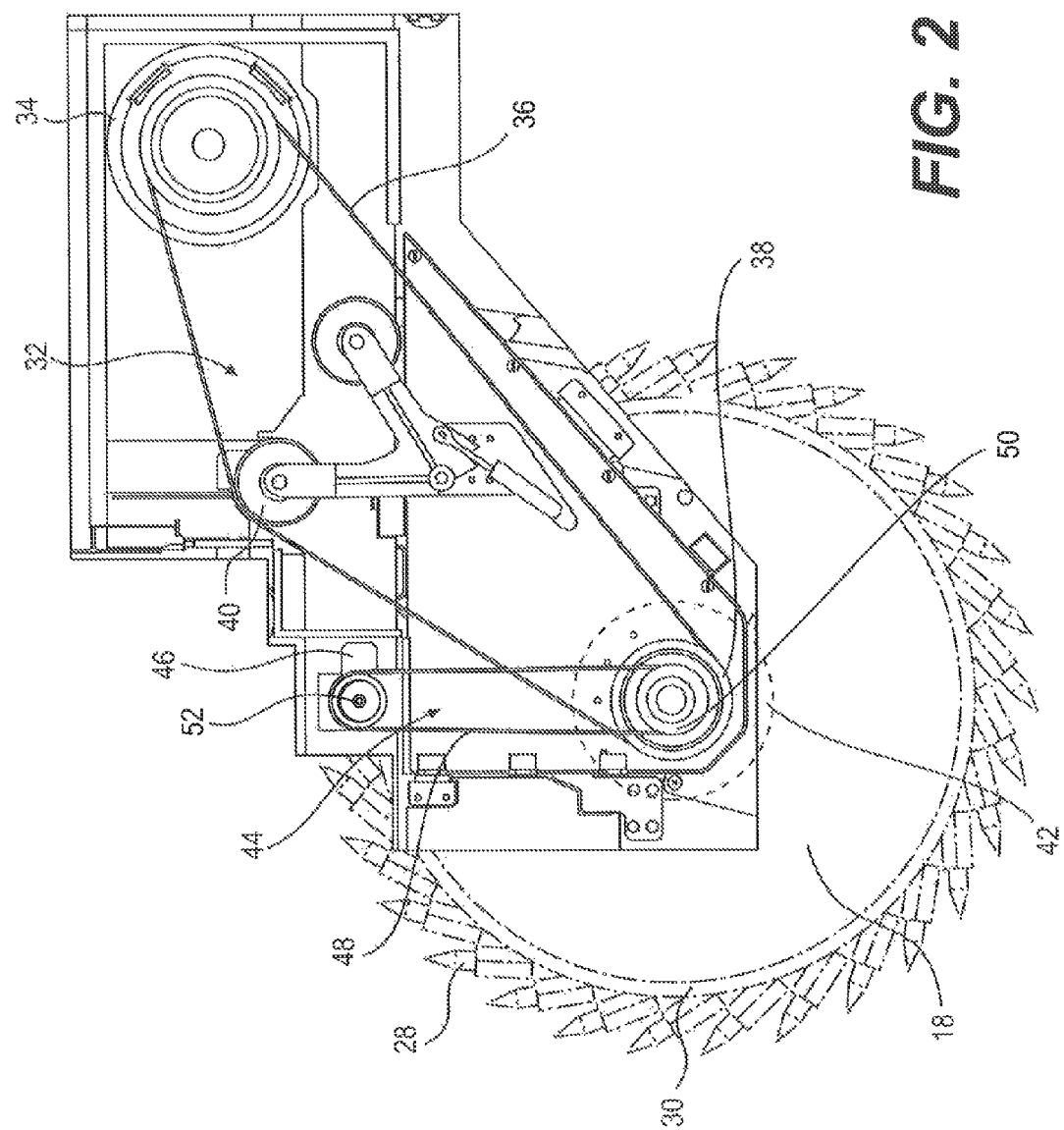
FIG. 2 is a pictorial illustration of an exemplary disclosed drivetrain that may be used with the exemplary disclosed cold planer of FIG. 1.

As shown in FIG. 2, milling drum 18 may include components rotated by power source 22 to fragment and remove chunks of asphalt and/or other material from road surface 12. Specifically, milling drum 18 may include one or more spiraling rows of cutting tools 28 operatively connected to an outer cylindrical surface 30.

A primary drivetrain 32 may be connected to milling drum 18. Primary drivetrain 32 may be comprised of power transmission components responsible for transferring power from power source 22 to milling drum 18. For example, primary drivetrain 32 may include a primary motor 34 mechanically connected to 22, a drive belt 36, a drive pulley 38, a tensioning roller 40, and a gear box 42. Drive belt 36 may be arranged to connect primary motor 34 to drive pulley 38. Drive pulley 38 may be connected to an end of milling drum 18 by gear box 42. A cover 24 (shown only in FIG. 1) may be used to seal primary drivetrain 32 from the environment.

Primary motor 34 may be any type of motor known in the art, such as a hydraulic, pneumatic, or electric motor. In embodiments where primary motor 34 is a hydraulic or pneumatic motor, power source 22 pressurizes fluid that is subsequently directed through primary motor 34. In embodiments where primary motor 34 is an electric motor, power source 22 may generate electricity that is subsequently directed through primary motor 34.

Drive belt 36 and drive pulley 38 may operatively connect primary motor 34 to gear box 42. Drive belt 36 may be v-shaped, flat, corrugated, cog-type, or even chain if desired. Drive pulley 38 may have corresponding geometry that meshes with drive belt 36 to transfer torque with little or no slipping. Drive belt 36 may transmit power from primary motor 34 to gear box 42 by using friction to rotate drive pulley 38. Drive pulley 38 may be connected to a shaft (not shown) of gear box 42, e.g. by way of a bolted flange and/or a keyed slot.

A tensioning roller 40 may be employed to help maintain tension in drive belt 36. Tensioning roller 40 may be configured to push a portion of drive belt 36 away from a direct path between primary motor 34 and drive pulley 38, thereby stretching drive belt 36 somewhat. This stretching may help to reduce slack in drive belt 36 and thereby reduce any slipping that may occur between primary motor 34, drive belt 36 and drive pulley 38. Because drive belts rely on friction to transmit power, belt tension is required in order to allow for efficient power transmission from primary motor 34 to drive pulley 38.

Gear box 42 may be employed between drive pulley 38 and milling drum 18 in order to rotate milling drum 18 at a speed and torque that is different than the speed and torque at which drive pulley 38 rotates. Gear box 42 may rotate milling drum 18 at a lower speed and a higher torque than those of drive pulley 38. For example, gear box 42 may be connected to drive pulley 38 while it rotates at 200 revolutions per minute and gear box 42 may rotate milling drum 18 at 100 revolutions per minute. This gearing may allow milling drum 18 to be as forceful as is necessary to remove chunks of asphalt and/or other material from roadway surface 12. Gear box 42 may include any number of gears arranged in any configuration (e.g. simple, compound, planetary, etc.). Gear box 42 may also include an output shaft (not shown) connected to milling drum 18, and one or more input shafts (not shown) connected to the gear train. At least one of the input shafts may be connected to drive pulley 38.

Cover 24 may be used to cover primary drivetrain 32 in order to protect the associated components from hazards such as debris. Cover 24 may remain in place during normal operation of cold planer 10, but may be removable for service and inspection of cold planer 10.

For the purposes of this disclosure, normal operation may be defined as operation of cold planer 10 not involving the inspection or servicing of milling drum 18. Operation of cold planer 10 for the purposes of inspecting or servicing milling drum 18 may be defined as service operation.

An auxiliary drivetrain 44 is connected to milling drum 18, and is comprised of power transmission components that provide for selective rotation to milling drum 18 without relying on primary motor 34 for power. In the disclosed embodiment, auxiliary drivetrain 44 includes a service motor 46, a service belt 48, and a service pulley 50. Service belt 48 is arranged to operatively connect service motor 46 to service pulley 50. Service pulley 50 may be connected to milling drum 18 by gear box 42.

Service motor 46 may be any type of motor known in the art, such as a hydraulic or an electric motor. The electrical power used to drive service motor 46 may be derived from a battery 26 (shown only in FIG. 1) supported by frame 14. If service motor 46 is a hydraulic motor, then battery 26 may drive a pump (not shown) that supplies pressurized fluid to service motor 46. It is contemplated that service motor 46 could alternatively be driven by power source 22, if desired.

Service belt 48 and service pulley 50 operatively connects service motor 46 to gear box 42. Service belt 48 may be v-shaped, flat, corrugated, or cog-type. Service belt 48 may alternatively be a chain, if desired. Service pulley 50 may have corresponding geometry that meshes with service belt 48 to transfer torque with little or no slipping. Service belt 48 may transmit power from service motor 46 to gear box 42 by using friction to rotate service pulley 50. Service pulley 50 may be connected to a shaft (not shown) of gear box 42, e.g. by way of a bolted flange and/or a keyed slot.

In the disclosed embodiment, service pulley 50 may be independently connected to gear box 42. For example, drive pulley 38 could have a central passageway in which service pulley 50 may pass through and engage gear box 42. Service pulley 50 may be connected to the same or a different shaft (not shown) of gear box 42, as desired. Such an arrangement may result in service pulley 50 extending further away from an end of milling drum 18 than drive pulley 38 in an axial direction. This arrangement may also result in service belt 48 being axially further away from milling drum 18 than drive belt 36.

In some embodiments, service motor 46 may be connected to service belt 48 via a clutch mechanism 52. In these embodiments, clutch mechanism 52 may allow for selectively coupling and decoupling service motor 46 from service belt 48 and service pulley 50. Specifically, clutch mechanism 52 may allow service pulley 50 and service belt 48 to rotate somewhat independently of service motor 46 when clutch mechanism 52 is disengaged. In this state, primary motor 34 may power the rotation of milling drum 18 without interference by service motor 46. When clutch mechanism 52 is engaged, service motor 46 may rotate with service pulley 50. When service motor 46 is energized to rotate milling drum 18, clutch mechanism 52 may be engaged automatically to couple service motor 46 to service pulley 50 via service belt 48.

Service motor 46 may be located radially outside of drive belt 36. In some embodiments, service motor 46 may even be located outside of cover 24, under its own cover (not shown). Alternatively, cover 24 may enclose service motor 46, drive pulley 38, and drive belt 36.

Figure 3:
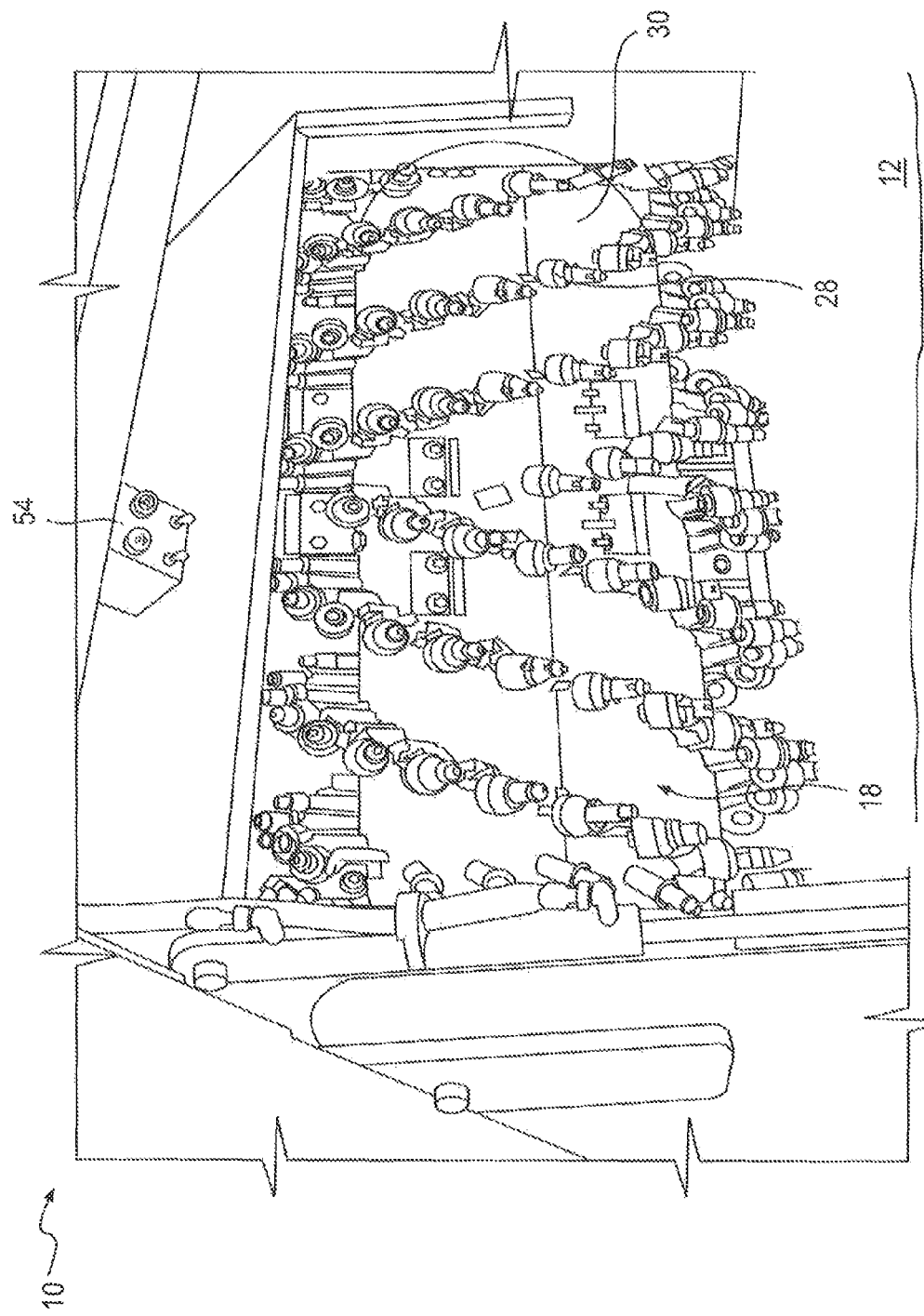
FIG. 3 is a pictorial illustration of a portion of the cold planer of FIG. 1.

However service motor 46 is powered, a service switch 54 may be provided to control the rotation of service motor 46. FIG. 3 illustrates an exemplary location of service switch 54 on cold planer 10. In this example, service switch 54 may be located at the underside of cold planer 10 in close proximity to milling drum 18. This placement may allow an operator to easily reach the switch while simultaneously inspecting or servicing milling drum 18.

Service switch 54 may be configured to allow for a finer control of the rotation of milling drum 18 than when milling drum 18 is being powered by primary motor 34. When primary motor 34 is powering the rotation of milling drum 18, milling drum 18 may be rotating rapidly and/or forcefully in order to perform the desired cutting of surface 12. In order to effectively perform the service and inspection procedures discussed above, however, milling drum 18 may need to be rotated more slowly and/or less forcefully. This also serves as a safety measure for the operator underneath cold planer 10. Service switch 54 may be configured to rotate milling drum 18 continuously while service switch 54 is being pressed and held. For example, service switch 54 may be able to rotate milling drum 18 for less than about two seconds or through less than about one quarter of a rotation when pressed and held for a period of time corresponding to the duration of the rotation. Service switch 54 may be a push button, momentary toggle switch, or any type of switch known in the art.

INDUSTRIAL APPLICABILITY

The disclosed auxiliary drivetrain 44 may be applicable to any cold planer or heavy machinery where periodic inspection and/or servicing of an associated drum is desired. Auxiliary drivetrain 44 may provide for improved drum inspection and repair procedures by allowing for a single operator to perform those procedures. The operation of cold planer 10 will now be described.

During normal operation of cold planer 10, primary motor 34 may be used to rotate drive pulley 38 by way of drive belt 36. Drive pulley 38 may transmit this rotation through gear box 42 to milling drum 18. Milling drum may be rotated rapidly, forcefully, and continuously during normal operation. Milling drum 18 may then force cutting tools 28 into work surface 12, causing the surface to be removed or milled down. This procedure may be used on asphalt or cement surfaces such as roadways or other paved areas in order to prepare the work surface for a new load bearing layer of asphalt of cement.

As this process continues, cutting tools 28 wear as they cut work surface 12, and in time they need to be replaced. In order to inspect or replace the cutting tools 28, milling drum 18 needs to be rotated slowly and through small rotational angles in order for a technician to assess or remove and replace cutting tools 28. When milling drum 18 is to be inspected, the primary motor 34 may be shut down, and milling drum 18 may be raised from work surface 12.

During the inspection process, service motor 46 may be used to rotate service pulley 50 by way of service belt 48. Service motor 46 may be controlled by service switch 54 located near milling drum 18 on an underside of cold planer 10. Service pulley 50 may transmit the rotation of service motor 46 through gear box 42 to milling drum 18 when clutch mechanism 52 is engaged. By utilizing service motor 46 instead of primary motor 34, energy consumption may be reduced, since service motor 46 may require much less power to rotate milling drum 18 because it is not cutting a work surface 12 or rotating rapidly.

Service switch 54 may provide finer control of the rotation of milling drum 18, which may allow a single operator to safely and efficiently inspect milling drum 18, or perform service thereon. During inspection or service, the operator may walk under cold planer 10 to have a view of milling drum 18. The operator may inspect or service cutting tools 28 that are within reach before operating service switch 54. Once the cutting tools 28 that are within reach are inspected or serviced, the operator may use service switch 54 to rotate milling drum 18 through less than a whole rotation to access cutting tools 28 that were previously not inspected or serviced. This process may continue until the entire cylindrical surface 30 and all of the cutting tools 28 have been inspected or serviced.

Locating service motor 46 radially outside of drive belt 36 may provide the benefit of exposing the motor to lower levels of vibration and dust. Reduced exposure to vibration and dust may increase the service life and reliability of the auxiliary drive.

It will be apparent to those skilled in the art that various modifications and variations can be made to the disclosed cold planer. Other embodiments will be apparent to those skilled in the art from consideration of the specification and practice of the disclosed cold planer. It is intended that the specification and examples be considered as exemplary only, with a true scope being indicated by the following claims and their equivalents.

What is claimed is:

1. A cold planer, comprising:
   a frame;
   a drum rotatably mounted to the frame;
   a gear box connected to the drum;
   a drive pulley connected to the gear box;
   a primary motor;
   a drive belt connecting the primary motor to the drive pulley;
   a service pulley connected to the gear box, the service pulley having a different diameter than the drive pulley;
   a service motor;
   a service belt connecting the service motor to the service pulley; and
   the gear box configured to transfer motion from the drive pulley and the service pulley to the drum.

2. The cold planer of claim 1, wherein the service motor is located radially outside of the drive belt.

3. The cold planer of claim 1, further including a cover configured to encase the drive pulley and the drive belt, wherein the service motor is located outside of the cover.

4. The cold planer of claim 1, wherein the service motor is an electric motor.

5. The cold planer of claim 1, wherein the service motor is activated when a power source of the cold planer is turned off.

6. The cold planer of claim 1, wherein the service pulley is connected to the gear box through a passage in the drive pulley.

7. The cold planer of claim 1, further including a service switch configured to control activation of the service motor, the service switch mounted in view of the drum.

8. The cold planer of claim 7, wherein the service switch is configured to allow an operator to rotate the drum through less than one quarter of a rotation.

9. The cold planer of claim 7, wherein the service switch is configured to allow an operator to rotate the drum for less than two seconds of rotation.

10. The cold planer of claim 1, further including a clutch mechanism configured to selectively couple and decouple the service motor from the service pulley.

11. The cold planer of claim 10, wherein the clutch mechanism automatically couples the service motor to the service pulley when the service motor is activated.

12. A cold planer, comprising:
    a frame;
    an engine supported by the frame;
    a battery supported by the frame;
    a drum rotatably mounted to the frame;
    a gear box connected to the drum;
    a drive pulley connected to the gear box;
    a hydraulic motor driven by fluid pressurized by the engine;
    a drive belt connecting the hydraulic motor to the drive pulley;
    an electric motor driven by the battery;
    a service pulley connected to the gear box, the service pulley having a different diameter than the drive pulley;
    a service belt connecting the electric motor to the service pulley; and
    the gear box configured to transfer motion from the drive pulley and the service pulley to the drum.

13. The cold planer of claim 12, wherein the electric motor is located radially outside of the drive belt.

14. The cold planer of claim 13, wherein the electric motor is located above the service pulley.

15. The cold planer of claim 12, further including a cover configured to encase the drive pulley and the drive belt, wherein the electric motor is located outside of the cover.

16. The cold planer of claim 12, wherein the service pulley is connected to the gear box through a passage in the drive pulley.

17. The cold planer of claim 12, wherein the service pulley is further away from the drum than the drive pulley.

18. The cold planer of claim 12, further including a service switch configured to control the activation of the electric motor, the switch mounted in view of the drum.

19. The cold planer of claim 18, wherein the service switch is configured to rotate the drum through less than one quarter of a rotation.

20. A method of operating a cold planer, comprising:
   pressurizing a fluid;
   directing pressurized fluid through a hydraulic motor to rotate a first belt;
   transferring a first motion from the first belt to a gear box;
   transferring the first motion from the gear box to a drum to rotate the drum during normal operation of the cold planer;
   directing electricity through an electric motor to rotate a second drive belt that has a different size than the first belt;
   transferring a second motion from the second drive belt to the gear box; and
   transferring the second motion from the gear box to rotate the drum during servicing of the cold planer.

* * * * *